Dec. 10, 1935.   L. G. KASSABIAN   2,023,685
METHOD OF PRESERVING DEAD BODIES
Filed Feb. 2, 1934

INVENTOR.

Patented Dec. 10, 1935

2,023,685

UNITED STATES PATENT OFFICE 2,023,685

METHOD OF PRESERVING DEAD BODIES

Levon G. Kassabian, Los Angeles, Calif.

Application February 2, 1934, Serial No. 709,499

6 Claims. (Cl. 204—8)

My invention relates to a method of preserving dead bodies and has for its principal object, the provision of a relatively simple and easily practiced method for the preservation of dead bodies and which method involves the coating or plating of the bodies which have preferably been embalmed, with metal or metals.

A further object of my invention is, to treat dead bodies so that the same may be preserved for indefinite periods and the treatment and preservation of the bodies being completely sanitary and highly effective in the prevention of dissemination of disease germs.

In preparing a dead body for preservation by my improved method, said body may be embalmed by any of the conventional methods now in use, but I prefer to inject into the arteries of the body an embalming compound consisting of approximately two ounces of chloride of zinc, three and one-half ounces of salicylate of sodium, one ounce of phenal crystals and sufficient water to replace the blood drawn from the body.

The foregoing chemicals are dissolved in the water while the latter is warm and after the liquid compound has become cool, it is injected into the arteries of the body, preferably through the femoral artery and the stagnant blood within the body is evacuated from the axillary vein.

When the ejected embalment fluid appears at the axillary region, the vein and the artery are ligated with a strong silk suture previously dipped in wax.

After the embalming process just described has been accomplished, I prepare a solution of corrosive sublimate, about two ounces dissolved in water, to which is added plaster of Paris and one ounce of sodium chloride, such mixture being gradually stirred and sufficient plaster of Paris added until the mixture is of a semi-viscid glutinous consistency. To this mixture is added one teaspoonful solution of creosote and this mixture is immediately injected through the anus into the previously cleansed intestinal canal so as to completely fill both the large and small intestines.

Such treatment will cause complete enterolithification of the bowels and will effect a gradual petrification of the abdominal viscera.

All of the orfices of the body are completely plugged with a paste preferably having plaster of Paris as its principal ingredient.

The body is now placed in the desired position of appearance and the body is now completely immersed or coated with liquid paraffin wax which when dry leaves a thin wax film over the entire surface of the body.

Figure 1:
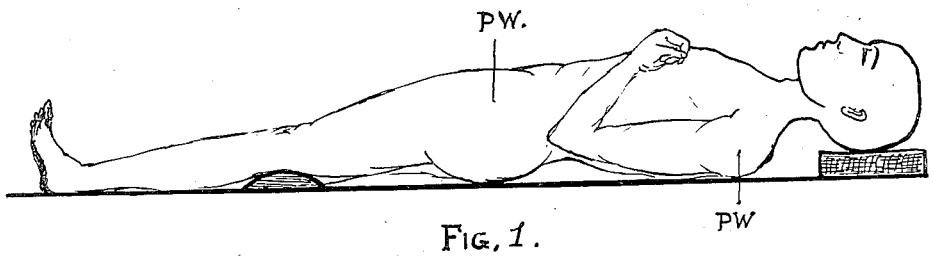

The wax coating of the body is designated by PW Fig. 1.

The body is now ready to be coated with metal in accordance with my improved method.

The metallic coating used in the preservation of the body is composed of substantially equal parts of lacquer and a suitable thinner, the amount of this compound depending on the size of the body to be coated and to such lacquer and thinner is added pure electrolitic pulverized copper.

This metallic compound should be of such a consistency as to readily pass through a suitable atomizer. This metallic solution is now sprayed onto the body and the operator taking precaution to attain a prefectly even coating on the facial surfaces.

After completion of the spraying of the metallic solution over the entire surface of the body, care should be exercised to avoid drafts striking the body while spontaneous evaporation of the lacquer is in progress.

The entire body, arms and legs are now covered with pure electrolytic thin flat copper wire W, the same being wound upon the body, arms and limbs so as to completely enclose the same. The copper wire which is of a thickness and width that may vary according to the size and weight of the body is wound upon the body, arms and legs, as illustrated in Fig. 2.

After completing the wiring of the body, pure copper plates and braces are applied to the body with plates P beneath the head and shoulders, a band or brace B around the waist and bands or braces R around the knees and around the insteps of the feet.

The braces thus applied to the body are highly essential for the reason that it is necessary to hold the body and particularly the arms, legs and feet in proper shape after the copper wire has been wound thereupon inasmuch as the wire is not of itself sufficiently strong to firmly hold the body in proper shape during the electro plating step. Furthermore by properly shaping the braces, the arms, limbs and the body may be firmly retained during the electro plating in natural positions so that the body may be preserved in either a sitting or reclining position. Further, the braces are applied to the arms and body so that they are disposed substantially at right angles to the axes of the major muscles that extend to and overlie the joints and which overlie the waist portion of the body.

Figure 2:
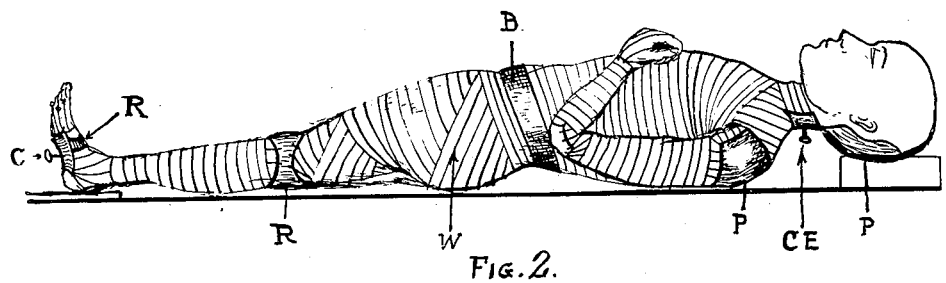

As shown in Fig. 2 the braces P are positioned beneath the shoulders, the brace B passes entirely around the waist of the body and the braces R pass entirely around the knees of the legs and entirely around the instep portions of the feet respectively.

The copper ring or terminal C is applied to the bands or braces that are applied to the arch portions of the feet and a similar ring or terminal CE is applied to the brace or plate that supports the neck, which rings or terminals are for the purpose of cathode connections during electroplating.

After the body has been completely wired and braced as just described and as illustrated in Fig. 2, I prepare a plating solution consisting of the following ingredients:

| | |
|---|---|
| Cyanide of copper | 4 ounces |
| Cyanide of sodium | 5 ounces |
| Hypo sulphate of soda | 1/30 of an ounce |
| Carbonate of soda | 2 1/4 ounces |
| Pure water | 1 gallon |

This solution is then heated to temperature of approximately 102° F. This electro plating solution is now applied to the wire wound body through the use of a cathode current which should be about five amperes to the square foot and the voltage depending upon the size of the body and which voltage ranges from six volts upward.

The anodes used in electro plating the body are formed from pure electrolytic rolled copper.

Previous to the electro plating of the body, I prefer to shave the hair from the head and placing on the head a wig and the facial features may be painted with oil paints to produce the natural color and expression of the individual as he appeared during life.

Thus the body completely enclosed within a natural shell or covering will be retained in its original form and shape for an indefinite period and this result is further insured, due to the fact that the treatment of the body previous to the electro plating practically petrifies the internal portions of the body and the treated bodies may be preserved in any climate without disintegration, decay or tissue degeneration.

The preserved bodies may be placed in mausoleums, thus rendering burial unnecessary.

Thus it will be seen that I have provided a relatively simple, economical and easily practiced method of preserving dead bodies.

I claim as my invention:

1. The herein described method of preserving dead bodies, which consists in coating the entire surface of the body to be preserved with wax, then applying to the wax coated body a thin layer or coating of a copper containing solution, then winding the body with copper wire so as to completely enclose same then applying braces to the neck and feet portions of the wire bound body, which braces are provided with electric terminals and then electroplating the wire wound coated body.

2. The herein described method of preserving dead bodies, which consists in coating the entire surface of the body to be preserved with wax, then applying to the wax coated body a thin layer or coating of a copper containing solution, then winding the body with copper wire so as to completely enclose same, then applying braces to certain portions of the joints and body to prevent bending and distortion thereof and then electroplating the wire wound coated body.

3. The herein described method of preserving dead bodies, which consists in applying a thin coating of wax to the entire surface of the body, then winding copper wire upon the wax coated body so as to wholly enclose same then applying braces to certain joints and portions of the wire wound body, certain of which braces carry electric terminals and then electroplating the wax coated wire wound body.

4. The herein described method of preserving dead bodies, which consists in applying a thin coating of wax to the entire surface of the body, then winding copper wire upon the body so as to wholly enclose same, then applying braces to certain portions of said body to prevent bending and distortion thereof and then electroplating the wax coated wire wound body.

5. The herein described steps in the method of preserving dead bodies, which consists in winding copper wire upon the body so as to entirely cover same, then applying braces to certain portions of the body to prevent bending and distortion and then electroplating the wire wound braced body.

6. The herein described method of preserving dead bodies, which consists in applying a thin coating of wax to the entire surface of the body, then applying to said wax coating a thin layer of a self-hardening copper containing compound, then winding the coated body with thin flat ribbonlike copper wire then applying braces that extend across and beneath certain of the wire wound joints of the body and then electroplating the coated wire wound body.

LEVON G. KASSABIAN.